United States Patent
Abfalterer

(10) Patent No.: US 9,718,000 B2
(45) Date of Patent: Aug. 1, 2017

(54) APPARATUS AND METHOD FOR MATERIAL TREATMENT OF RAW MATERIALS

(71) Applicant: Alexander Abfalterer, Vaduz (LI)

(72) Inventor: Alexander Abfalterer, Vaduz (LI)

(73) Assignee: MERENAS TRUST REG., Vaduz (LI)

( * ) Notice: Subject to any disclaimer, the term of this patent is extended or adjusted under 35 U.S.C. 154(b) by 0 days.

(21) Appl. No.: 14/435,801

(22) PCT Filed: Nov. 16, 2012

(86) PCT No.: PCT/EP2012/072896
§ 371 (c)(1),
(2) Date: Apr. 15, 2015

(87) PCT Pub. No.: WO2014/060052
PCT Pub. Date: Apr. 24, 2014

(65) Prior Publication Data
US 2015/0290556 A1    Oct. 15, 2015

(30) Foreign Application Priority Data
Oct. 16, 2012    (DE) .................. 10 2012 109 874

(51) Int. Cl.
*C10G 1/02*    (2006.01)
*C10B 53/07*    (2006.01)
(Continued)

(52) U.S. Cl.
CPC ............... *B01D 3/009* (2013.01); *C10B 1/00* (2013.01); *C10B 21/00* (2013.01); *C10B 47/06* (2013.01);
(Continued)

(58) Field of Classification Search
CPC ......... C10B 47/06; C10B 53/07; C10B 47/02; C10B 1/00; C10B 1/02; C10B 1/04;
(Continued)

(56) References Cited

U.S. PATENT DOCUMENTS 414,938 A * 11/1889 Burcey .................. C10B 15/00
202/105
896,167 A * 8/1908 Snyder ...................... C10B 1/04
201/19

(Continued)

FOREIGN PATENT DOCUMENTS

DE    74 40 112    2/1976
DE    28 34 475 C2    5/1987
(Continued)

OTHER PUBLICATIONS

English Translation of DE 10348987 A1 obtained from Espacenet.*
(Continued)

*Primary Examiner* — In Suk Bullock
*Assistant Examiner* — Jonathan Pilcher
(74) *Attorney, Agent, or Firm* — Law firm of Ursula B. Day

(57) ABSTRACT

The invention relates to an apparatus for the material treatment of raw materials. The apparatus has a heating system, a distillation unit and a reaction unit to be loaded with the raw materials for treatment. The heating system can be opened and closed to be fitted with the reaction unit. The heating system comprises a top element and a jacket element firmly connected to the top element, and supporting elements. The length of the support elements can be varied in the vertical direction, between two end positions, the heating system can be opened and closed in the vertical direction of
(Continued)

movement. The invention further relates to a method for operating an apparatus for the material treatment of raw materials.

12 Claims, 4 Drawing Sheets

(51) Int. Cl.

| | |
|---|---|
| *C10B 1/00* | (2006.01) |
| *C10B 1/04* | (2006.01) |
| *C10B 47/06* | (2006.01) |
| *B01D 3/00* | (2006.01) |
| *C10K 1/04* | (2006.01) |
| *C10B 47/46* | (2006.01) |
| *C10G 1/10* | (2006.01) |
| *C10K 1/02* | (2006.01) |
| *C10B 21/00* | (2006.01) |

(52) U.S. Cl.
CPC .............. *C10B 47/46* (2013.01); *C10B 53/07* (2013.01); *C10G 1/02* (2013.01); *C10G 1/10* (2013.01); *C10K 1/024* (2013.01); *C10K 1/04* (2013.01); *C10B 1/04* (2013.01); *C10G 2300/1003* (2013.01); *C10G 2300/1014* (2013.01); *Y02E 50/14* (2013.01); *Y02P 20/143* (2015.11); *Y02P 30/20* (2015.11); *Y02T 50/678* (2013.01)

(58) Field of Classification Search
CPC ........... C10B 57/14; C10B 53/02; C10B 1/10; C10G 1/10
USPC .......................... 202/209, 211, 213, 217, 221
See application file for complete search history.

(56) References Cited

U.S. PATENT DOCUMENTS

| | | |
|---|---|---|
| 4,207,168 A | 6/1980 | Simone |
| 5,644,997 A | 7/1997 | Martin et al. |
| 6,346,221 B1 * | 2/2002 | Wagner .................. B08B 15/02 202/218 |
| 7,214,252 B1 | 5/2007 | Krumm et al. |
| 2007/0053088 A1 | 3/2007 | Kranz et al. |
| 2010/0300865 A1 * | 12/2010 | Wu ......................... B29B 17/02 201/10 |

FOREIGN PATENT DOCUMENTS

| | | |
|---|---|---|
| DE | 40 11 945 C1 | 11/1990 |
| DE | 39 32 803 A1 | 4/1991 |
| DE | 41 26 319 A1 | 2/1993 |
| DE | 44 41 423 A1 | 6/1997 |
| DE | 695 11 626 T2 | 12/1999 |
| DE | 199 30 071 C2 | 9/2001 |
| DE | 203 14 205 U1 | 3/2004 |
| DE | 103 48 987 A1 | 5/2005 |
| DE | 20 2007 014 636 U1 | 2/2008 |
| DE | 10 2008 030 983 A1 | 1/2010 |
| DE | 20 2011 102 526 U1 | 12/2011 |
| JP | S56 109 282 | 8/1981 |
| JP | 2001/311512 | 11/2001 |
| JP | 2001/354971 | 12/2001 |
| WO | WO2007/053088 A1 | 5/2007 |
| WO | WO2010/012275 | 2/2010 |

OTHER PUBLICATIONS

English Abstract of DE 10348987 A1 obtianed from Espacenet.*
English Translation of WO 2010/012275 A2 obtained from Espacenet.*
English Translation of JP 2001-354971 (application No. 2000-223474) obtained from AIPN.*
International Search Report issued by the European Patent Office in International Application PCT/EP2012/072896.

* cited by examiner

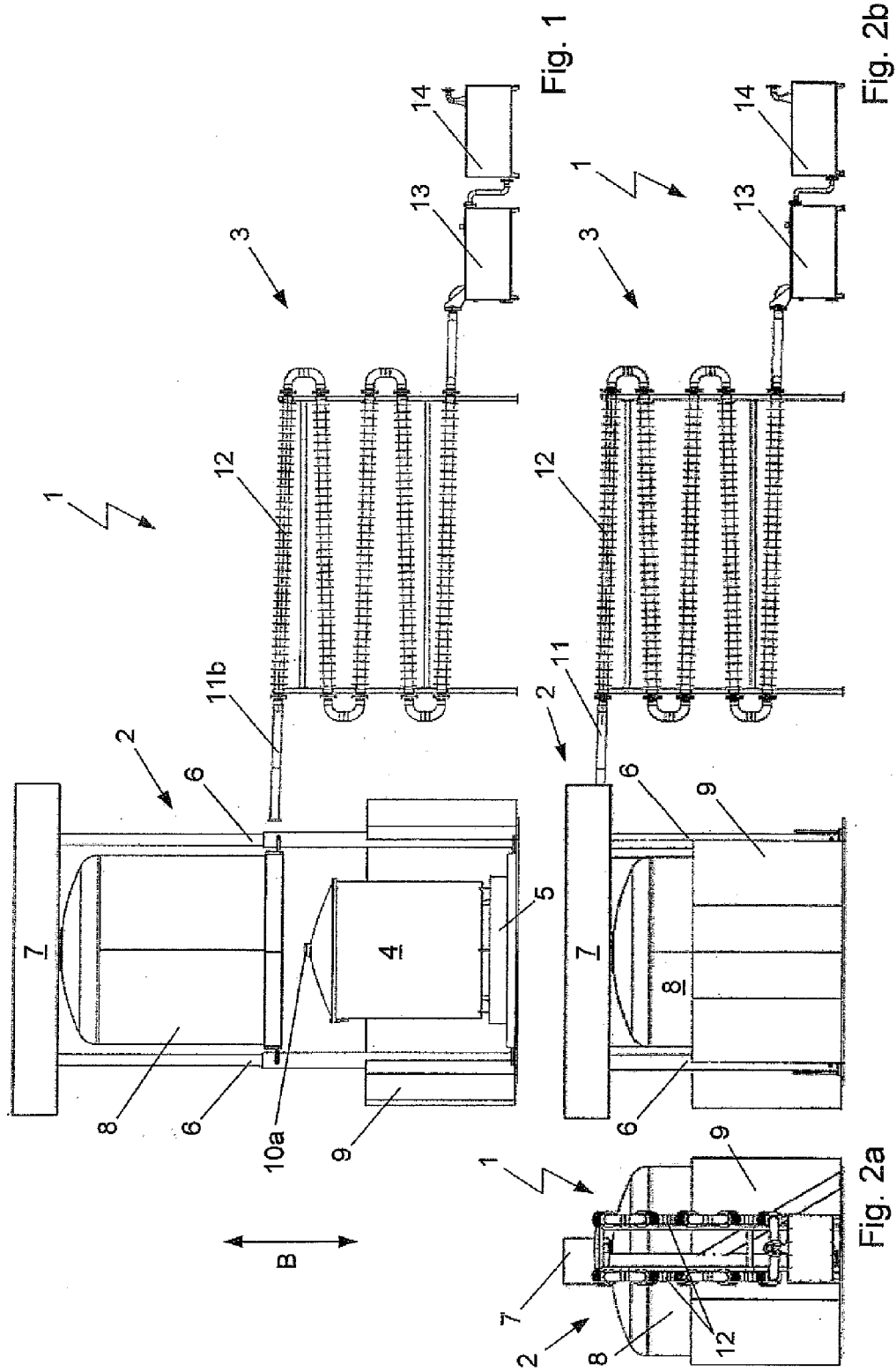

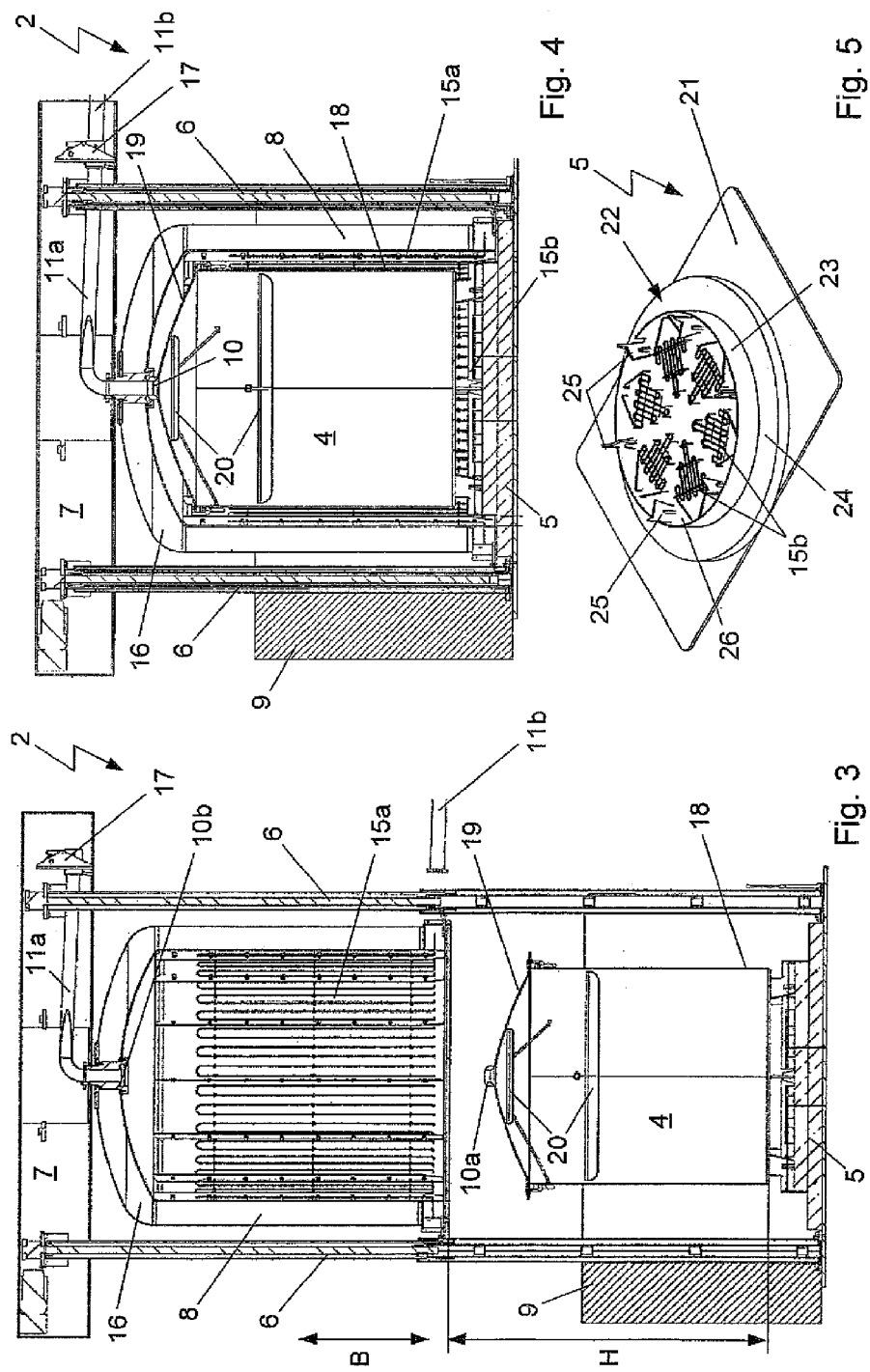

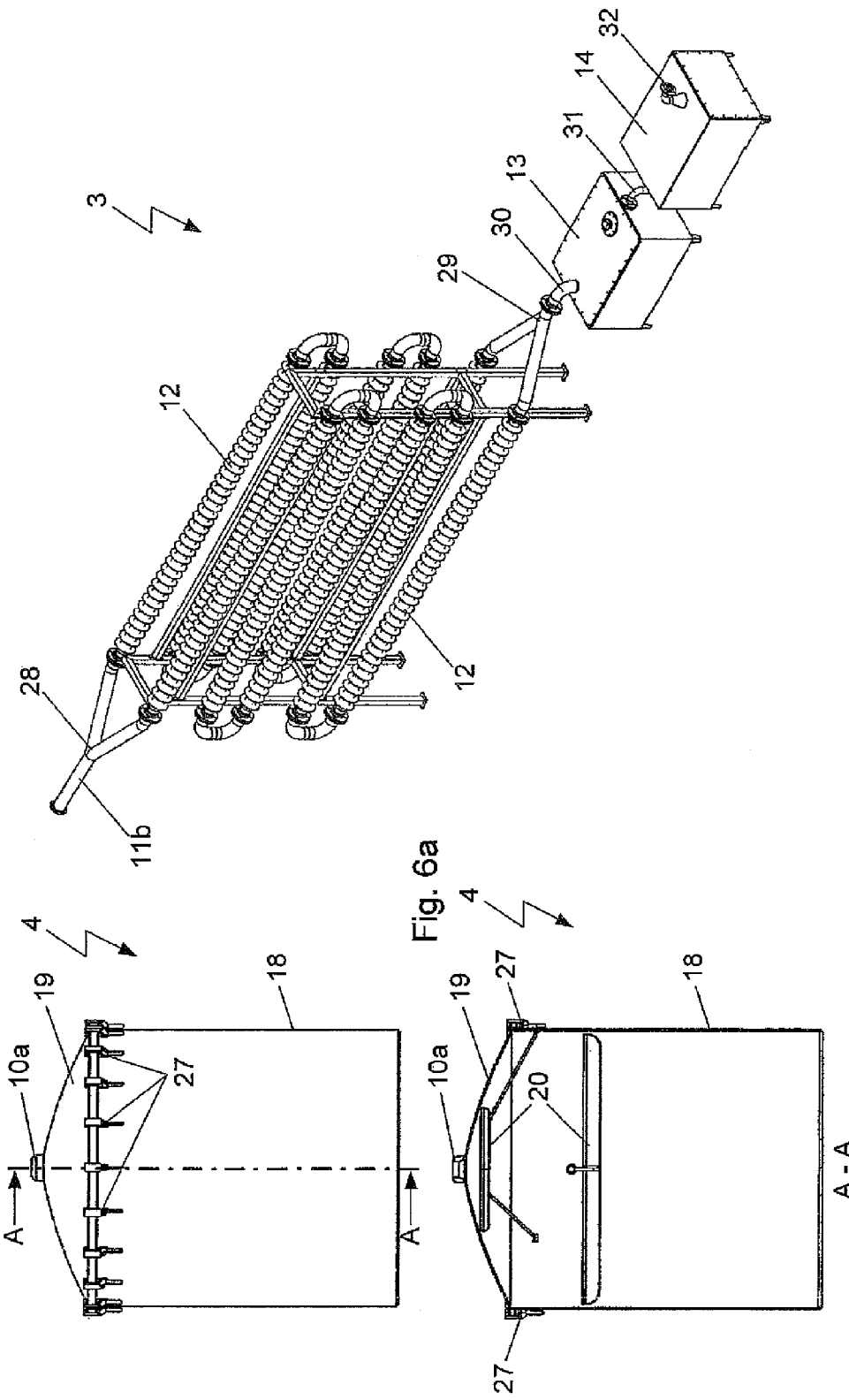

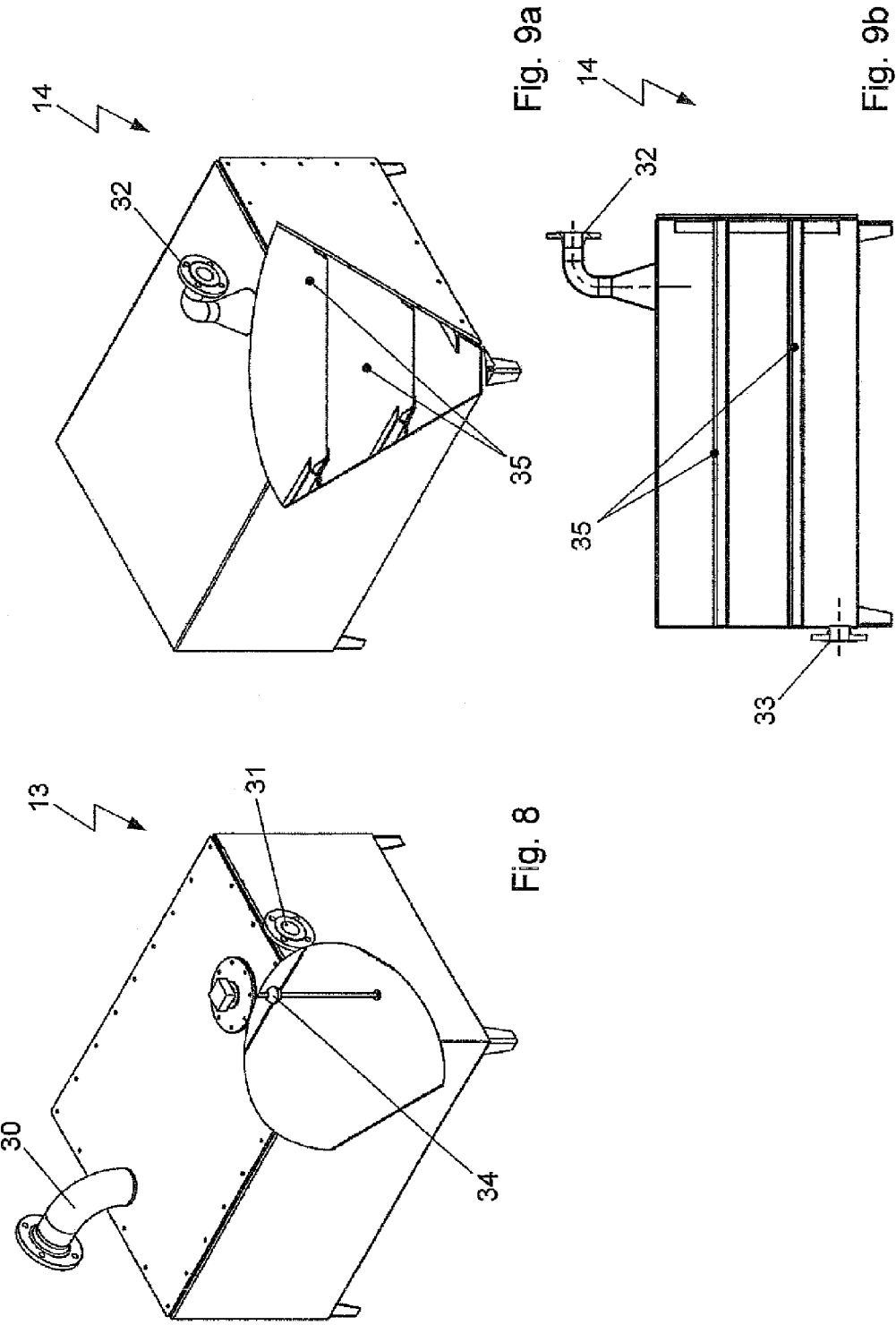

APPARATUS AND METHOD FOR MATERIAL TREATMENT OF RAW MATERIALS

CROSS-REFERENCES TO RELATED APPLICATIONS

This application is the U.S. National Stage of International Application No. PCT/EP2012/072896, filed Nov. 16, 2012, which designated the United States and has been published as International Publication No. WO 2014/060052 and which claims the priority of German Patent Application, Serial No. 10 2012 109 874.3, filed Oct. 16, 2012, pursuant to 35 U.S.C. 119(a)-(d) the description of which is hereby incorporated by reference.

BACKGROUND OF THE INVENTION

The invention relates to an apparatus for material treatment of raw materials. The apparatus has a heating system, a distillation unit and a reaction unit. The reaction unit is designed such that it can be charged with the raw materials for treatment. The heating system can be opened and closed for being fitted with the reaction unit. The apparatus is also referred to as an industrial module for low-temperature carbonization and distillation. The invention also relates to a method for operating an apparatus for material treatment of raw materials.

The apparatus is intended for the industrial treatment, in particular of waste rubber products, rubber products or rubber-like composite products, such as scrap tires, steel-cord-reinforced rubber belts, rubberized chain links and conveyor belts, and also crushed scrap vehicles, organic renewable raw materials, such as wood, contaminated inorganic carbons and contaminated soils. Light crude oil, gas, metals, in particular steel, and inorganic carbon are thereby obtained.

Installations known from the prior art are based on the use of rotary kilns, fluidized bed reactors and drums and operate with compacted starting material or in a chemically inert atmosphere with the exclusion of oxygen.

DE 695 11 626 T2 discloses a furnace for the thermal treatment of solid materials. The furnace has a rotary element, in which the solid materials circulate, and a heating means. The fixed heating means, arranged coaxially and inside the rotary element, is designed in such a way as to channel the solid materials and ensure their preheating and/or heating.

DE 199 30 071 C2 describes a method and an apparatus for making use of organic materials and mixtures of materials. The organic material is thereby brought into contact with fluidized bed material of the combustion fluidized bed. The method produces end products in the form of gases with condensable substances and remaining carbon-containing materials.

DE 44 41 423 A1 discloses a method and an apparatus for recovering usable gas from refuse. This involves introducing the comminuted refuse into a gastight drum. In the drum, gas is generated and separated from the remaining material formed at the same time. The gas generated is cracked in a gas converter while feeding in air, and in the presence of a glowing coke bed, to form a cracked gas. The heat required in the method is transferred by a gas in direct contact with the material to be put to use. For the transfer of the heat to the gas, a partial stream of the cracked gas leaving the gas converter is used.

DE 41 26 319 A1 shows a method for making use of silicone rubber vulcanizates in which the vulcanizates are heated to 350° C. to 700° C. and the volatile siloxanes thereby produced are condensed. Siloxanes and fillers are produced in particular as products.

DE 40 11 945 C1 discloses a method for degasifying organic substances, such as for example household or industrial refuse and the like, in a heatable chamber. In the method, the starting materials are introduced into a chamber while being compacted and pass through the cross section of the chamber while maintaining the compacted state. Heat is fed in via the chamber walls under pressure from being in contact with the compacted material. The gaseous products forming are discharged under increased pressure. The chamber is closed in a gastight manner in its charging region by the compacted material. An increased flow resistance is achieved in the region of the outflow of the gaseous products by recompaction of the remaining solid materials.

DE 39 32 803 A1 discloses a process for reacting organic materials with the addition of boric acid/boron oxide and organic nitrogen compounds in a non-oxidizing atmosphere or in a vacuum to form coal and graphite. Increased amounts of expenditure on material, energy and logistics are required for operating conventional installations.

The use of protective gases, that is to say a non-oxidizing atmosphere, means for example that the throughput with comparable units is low. The creation of a fluidized bed for fluidized bed reactors requires increased expenditure of energy, since on the one hand the fluidized bed has to be created and retained and on the other hand the materials to be used have to be mechanically prepared in such a way that they come into effective contact with the fluidized bed.

High energy costs are likewise incurred as a result of the compacting of the starting materials during preparation and during the process of using them.

SUMMARY OF THE INVENTION

The object of the present invention is to provide an apparatus and a method for the treatment of various waste rubber products; rubber or rubber-like composite products. When doing so, it is intended to separate the composite products and recover components of value, such as carbon, light crude oil, gas and possibly metallic materials. The apparatus is intended to be of a simple construction and feasible at low cost.

The object is achieved by an apparatus according to the invention for material treatment of raw materials. The apparatus has a heating system, a distillation unit and a reaction unit. The reaction unit is designed such that it can be charged with the raw materials. The heating system can be opened and closed for being fitted with the reaction unit.

According to the conceptual design of the invention, the heating system comprises a top element and a jacket element, firmly connected to the top element, and also supporting elements. The top element is arranged in a secured manner on the supporting elements, which are variable in length in the vertical direction. By varying the length of the supporting elements between two end positions, the heating system is opened and closed in a vertical direction of movement.

According to an advantageous embodiment of the invention, the heating system has two supporting elements. The supporting elements are in this case preferably arranged on both sides of the heating system. According to a first alternative, the supporting elements are driven by electric spindles. According to a second alternative, the supporting elements are formed as hydraulic supports.

According to a development of the invention, the jacket element is formed with a hollow-cylindrical wall. In the vertical direction, the wall is downwardly open and upwardly closed by a circular shroud. The jacket element is connected at the shroud to the top element to form a unit.

The jacket element advantageously has combustion tubes arranged in a distributed manner uniformly around the circumference of the inner surface of the wall. The wall also has a thermal insulation of ceramic powder to prevent the transfer of heat outside to the surroundings.

According to a preferred embodiment of the invention, the shroud is formed at the center point with an exhaust stub as a connection to an exhaust line. The exhaust line in this case extends from the exhaust stub through the shroud into the top element of the heating system.

The exhaust line advantageously has at the distal end with respect to the exhaust stub of the shroud a connecting element as a connection to an exhaust line of the distillation unit.

According to a further embodiment of the invention, the reaction unit is formed with a wall in the form of a hollow-cylindrical vessel, which is closed at the bottom. The open side of the wall can be closed by means of a cover element.

A high-temperature-resistant seal is advantageously arranged between the wall and the cover element.

The cover element of the reaction unit is preferably of a circular design and has at the center point an exhaust stub. It is of particular advantage that the exhaust stub of the cover element and the exhaust stub of the jacket element engage in one another and form a sealed connection with respect to the exhaust line in the closed state of the heating system.

According to an advantageous embodiment of the invention, the reaction unit internally has screening elements. The screening elements are in this case horizontally aligned and arranged at different heights, at a distance from one another. The screening elements preferably cover the entire cross section of the reaction unit.

The method according to the invention for operating the apparatus for material treatment of raw materials comprises the following steps:
  charging a reaction unit with raw materials,
  preheating the reaction unit,
  opening a heating system and bringing the reaction unit onto a bottom element of the heating system,
  closing the heating system, so that the reaction unit is arranged in a closed space,
  heating the reaction unit and starting a low-temperature carbonization and distillation process,
  discharging gases produced from the reaction unit into a distillation unit,
  cooling and condensing the gases in the distillation unit,
  introducing the distillation products into an oil tank and separating oil,
  transferring non-condensable gases from the oil tank into a gas filter tank and filtering the gases,
  opening the heating system and removing the reaction unit from the heating system,
  cooling the reaction unit, removing the end products from the reaction unit and separating the end products, and also
  removing the end products from the oil tank and the gas filter tank.

The heating system is advantageously opened and closed by extending and retracting supporting elements.

According to a particularly advantageous embodiment of the invention, when closing the heating system, an exhaust stub of the reaction unit is coupled together with an exhaust stub of an exhaust line of the heating system and also the exhaust line of the heating system and an exhaust line of the distillation unit are coupled together at a connecting element. A gastight connection of the reaction unit to the distillation unit is thereby advantageously produced.

The method is preferably operated in a modular manner with at least four reaction units at the same time and the following steps:
  charging a first reaction unit, while a second reaction unit that has already been charged is preheated,
  feeding a third, charged and preheated reaction unit to the heating system and heating the reaction unit for carrying out the low-temperature carbonization and distillation process, and also
  cooling and emptying a fourth reaction unit, in which the low-temperature carbonization and distillation process has ended.

According to a development of the invention, the reaction unit is charged with raw materials of a mass in the range from 2.5 t to 3 t. The reaction unit advantageously remains in the heating system for a period in a range from approximately 2.5 h to 3.5 h. The reaction temperature within the reaction unit is preferably between 350° C. and 650° C., with energy in the range of 40 kWh being consumed per hour.

The method according to the invention is based on a low-temperature carbonization and distillation process, so that the apparatus according to the invention is an industrial module for low-temperature carbonization and distillation.

For effectively carrying out the method, the apparatus was based on being formed with modules, in order in this way to be able to optimize or maximize the throughput and also adapt it to the demand at the particular time.

Further advantages of the industrial module for low-temperature carbonization and distillation in comparison with the prior art can be summarized as follows:
  no presorting of the raw materials,
  treatment of
    waste rubber products, such as scrap tires, rubberized chain links, steel-cord-reinforced rubber belts and conveyor belts, the products being able to be treated in their original form, in order to retain their structure, and not having to be comminuted or shredded,
    organic and renewable raw materials, for example wood in all forms, in particular beech and oak,
    contaminated inorganic carbons,
    reactivation of activated charcoal after use and also
    contaminated soils, contaminated water or other materials, for example after oil spills, and
    crushed or shredded scrap vehicles,
  ecological, economical and carbon-dioxide-free, and consequently sustainable, technology with very low energy consumption.

Further major advantages are that the steel-rubber composites, which until now could only be separated with great effort in terms of energy, can be separated without having to use any significant amounts of energy from external sources. The products produced can be passed on for high-value use in the sense of efficient recycling, which contributes to conserving resources. It also opens up application areas for the materials obtained by the method, some of which are completely novel, the products produced being based on various percentage distributions, which in turn are based on the differently used raw materials. Among the products produced are:

light crude oil, for example with a density of approximately 927 kg/m$^3$ at 15° C., a viscosity of 4.74 mm$^2$/s and a flame point below 21° C., gas, metals, predominantly steel or iron and titanium, and also inorganic carbon.

Depending on the starting raw material, the carbon has a degree of purity in the range from 95% to 99.9%, with a BET surface area in the range from 1500 m$^2$/g BET to 2500 m$^2$/g BET a very high adsorption capacity without emitting substances to the environment. Consequently, the environment is not polluted, for example by washouts.

The following can be listed by way of example as application areas:

light crude oil
   in the chemical, industry and in the pharmaceuticals industry,
   for generating thermal energy and electrical energy, for example by means of a cogeneration plant,
gas
   for generating thermal energy and electrical energy, for example by means of a gas turbine and generator, or for return and use in the process,
steel
   in the steel industry—very low process temperatures mean that all metals maintain their physical and chemical properties,
inorganic carbon
   in the food industry and in medicine,
   for use in descaling systems,
   for diamond manufacture,
   for producing rechargeable batteries and storage systems for electrical energy,
   as a filler for unvulcanized rubber in rubber and tire production,
   in aircraft construction and
   in the construction industry.

The carbon may be used as activated charcoal, for example as a filter for water treatment of for cleaning gas in exhaust systems. With the aid of the filters, salt water can be advantageously converted into fresh water, and oil, gasoline or acid can be filtered out of water.

The introduction of the carbon into the water also improves the quality of the water with respect to the oxygen content—it promotes oxygen exchange, for example when used in an aquarium. Another advantage is that *coli* bacteria for example only become active at increased temperatures of the water of approximately 36° C. to 38° C. and above. At temperatures below the indicated range, on the other hand, no *coli* bacteria are formed.

On account of its properties, carbon is suitable for combating oil pollution. The carbon floats on the surface of the water and binds oil that is on the water, such as for example when there are accidents at sea. It can however also equally be used for cleaning soils contaminated with mineral oil, that is to say in cases of ground contamination, or in other cases of oil pollution or contaminated substances. In such cases, filter material with a mass of 2 kg absorbs up to 10 liters of oil.

Similarly, the carbon is advantageously used for fighting fires on land and in water, in particular for combating burning oil. The carbon can consequently be used as an extinguishing agent, the fire being starved of oxygen by covering, with an appropriate amount of carbon to smother the flame.

A further application of the carbon is for fire protection and thermal insulation up to 3500° C. Thermal insulation is understood here as also meaning insulation at very low temperatures, that is to say insulation from the cold.

For example, coating glass with carbon leads to an increase in the fire resistance together with a thermal insulating effect.

A mixture of cement and carbon in a ratio of 3:1 has very good properties with respect to thermal resistance. Thus, for example, a sheet of carbon cement with a thickness of 1 cm is heat-resistant up to temperatures of 1200° C.

Moreover, the radiation-resistant carbon can be used in plants and apparatuses where radiation protection is necessary. The advantageous properties, such as radiation resistance and fire resistance, lead for example to use in the construction of containments for nuclear reactors.

As a very good store for water and nutrients, another application area for carbon is in the provision of water-retaining layers. In cultivated areas, this leads to a water saving of 60% to 80%.

For example, the use of carbon under layers of sand allows water and plant nutrients to be stored and poor, low-quality soils to be used as a location for vegetables and other agricultural products. This application is consequently of great advantage for the reclamation of desert regions, in horticulture and in agriculture. At the same time, the carbon also does not give off any substances to the water, and so there is no pollution of the soil and the groundwater as a result of harmful substances being washed out.

Depending on the type of raw materials used, with an energy input of approximately 2.41 GW a year it is respectively possible to produce approximately 10.5 GW of power and heat. It is assumed here that the gas occurring in the process is used completely for power and heat generation. The energy yield can be increased up to 20.6 GW or a ratio of 9.96 of energy yield and energy consumption.

BRIEF DESCRIPTION OF THE DRAWING

Further details, features and advantages of the invention emerge from the following description of exemplary embodiments with reference to the associated drawings, in which:

FIG. 1 shows an industrial module for low-temperature carbonization and distillation as an apparatus for material treatment of raw materials in the opened state in a front view, FIG. 2*a* shows an industrial module for low-temperature carbonization and distillation as an apparatus for material treatment of raw materials in the closed state in a side view and FIG. 2*b* shows it in a front view, FIG. 3 shows a sectional representation of the heating system in the opened state, FIG. 4 shows a sectional representation of the heating system in the closed state, FIG. 5 shows a bottom element of the heating system, FIG. 6*a* shows the reaction unit in the closed state, FIG. 6*b* shows a sectional representation of the reaction unit in the closed state, FIG. 7 shows a distillation unit, FIG. 8 shows an oil tank, FIG. 9*a* shows a gas filter tank and FIG. 9*b* shows a sectional representation of the gas filter tank.

DETAILED DESCRIPTION OF PREFERRED EMBODIMENTS

In FIGS. 1, 2*a* and 2*b*, an industrial module for low-temperature carbonization and distillation is represented as an apparatus 1 for material treatment of raw materials. FIG. 1 shows the apparatus 1 in the opened state in a front view, while the apparatus 1 in the closed state can be seen in a front view in FIG. 2b and in a side view in FIG. 2a.

The apparatus 1 has a heating system 2 and also a distillation unit 3. The reaction unit 4 charged with raw materials is preheated to a certain temperature in a preheating device (not represented) and subsequently heated further in the heating system 2. The reaction unit 4 may in this case have been charged with a mixture of various raw materials, so that no presorting of the products is necessary. After the preheating, the reaction unit 4 is brought into the opened heating system 2 and positioned on the bottom element 5 of the heating system 2.

The top element 7 and the jacket element 8, firmly connected to the top element 7, of the heating system 2 are secured in a movable manner, in the direction of movement B, by means of supporting elements 6 arranged on both sides of the heating system 2. The supporting elements 6 are arranged at a distance from one another of approximately 2.9 m. The jacket element 8 has an outside diameter of approximately 2.5.

In the first end position according to FIG. 1, the supporting elements 6 have been extended. The apparatus 1 has in this case a height of approximately 6.70 m. The top element 7 and the jacket element 8 allow free access to the space for fitting the heating system 2 with the reaction unit 4. The heating system 2 has been opened. The reaction unit 4 can be introduced into the heating system 2 or removed from the heating system 2. The movement of the reaction unit 4 may in this case advantageously take place by means of a rail system (not represented), on which the reaction unit 4 stands. In the second end position according to FIGS. 2a, 2b, the supporting elements 6 have been retracted. The apparatus 1 has in this case a height of approximately 3.70 m.

The jacket element 8 stands on the bottom element 5 in such a way that the reaction unit 4 is positioned in a closed space. The heating system 2 has been closed. The reaction unit 4 is surrounded at the bottom by the bottom element 5 and at the side surface and above by the jacket element 8.

The heating system 2 has in the lower region an enclosure 9. The enclosure 9, enclosing the bottom element 5 and also the side surfaces of the jacket element 8 in the closed state of the heating system 2, is opened for fitting the unit into the heating system 2.

The gases produced in the low-temperature carbonization process are discharged from the heating system 2 through the exhaust line 11 provided and are cooled by process engineering measures. The gases are in this case passed through the exhaust stub 10a, formed at the uppermost point of the reaction unit 4, and also the exhaust line, arranged in the top element 7, to the distillation unit 3. Subsequently, the gases flow through the cooling section 12 of the distillation unit 3. According to FIGS. 1, 2a and 2b, the cooling section is formed by tubes. The tubes, arranged inclined in relation to the horizontal, are provided with ribs to increase the heat-transferring surface area and consequently improve the heat transfer. The heat is in this case transferred from the gases to the surrounding air. According to an alternative embodiment, the gases may also be cooled by another fluid, for example water, within the cooling section 12.

The cooling section 12 is formed with two tubes aligned parallel to one another. The gases are divided between two partial mass flows before entering the cooling section 12 and are mixed again after flowing through the cooling section 12.

Subsequently, the distillation products are introduced into the oil tank 13. The oil obtained from the low-temperature carbonization process and the subsequent distillation, which corresponds in its consistency and composition to a light crude oil or is very similar to the intermediate products of crude oil processing, then settles in the oil tank 13. The non-condensable component of the gas is transferred from the oil tank 13 into the gas filter tank 14 and filtered in the gas filter tank 14.

FIGS. 3 and 4 respectively show a sectional representation of the heating system 2. In FIG. 3 the heating system 2 is represented in the opened state and in FIG. 4 it is represented in the closed state.

According to FIG. 3, the supporting elements 6 have been fully extended. The top element 7, arranged at the upper ends of the supporting elements 6, and the jacket element 8, firmly connected to the top element 7, are in this case arranged at a height H above the bottom element 5, that the reaction unit 4 is freely movable in the horizontal direction between the bottom element 5 and the jacket element 8.

The jacket element 8 is supported in the lower region movably with respect to the supporting elements 6. By means of the lateral support with respect to the supporting elements 6, a straight movement of the jacket element 8 in the direction of movement B between the end positions is ensured. Canting of the jacket element 8 is avoided.

The jacket element 8 has combustion tubes 15a distributed uniformly around the circumference of the inner surface of the jacket. The combustion tubes 152 are in this case arranged substantially in the vertical direction and are led through the wall to the inner surface in the lower region of the jacket element 8. The combustion tubes 15a are respectively formed by two portions that are aligned perpendicularly and are connected to one another at the upper end by means of a redirecting piece.

The jacket element 8, which is open downwardly in the vertical direction, is closed upwardly by a shroud 16 and fastened to the top element 7. The top element 7 and the jacket element 8 form a single unit. The shroud 16 is formed at the center point with an exhaust stub 10b as a connection to the exhaust line 11a. The exhaust line 11a extends from the exhaust stub 10b through the shroud 16 into the top element 7. The lead-through of the exhaust line 11a through the shroud 16 is sealed off with respect to the shroud 16.

The exhaust line 11a has at the distal end, taken from the exhaust stub 10b, a connecting element 17. The connecting element 17, advantageously formed as a quick-action coupling, serves in this case for the connection of the exhaust line 11a of the heating system 2 to the exhaust line 11b of the distillation unit 3 in the closed state of the heating system 2 according to FIG. 4. The downward movement of the top element 7 during the closing of the heating system 2 has the effect that the exhaust lines 11a, 11b and the exhaust stubs 10a, 10b are coupled to one another at the connecting element 17, so that a gastight connection from the reaction unit 4 to the distillation unit 3 is produced.

The reaction unit 4, arranged on the bottom element 5, is designed with a wall 18 in the form of a hollow-cylindrical vessel with an outside diameter of approximately 1.8 m, which is closed at the bottom. The open side of the wall 18 can be closed by means of a cover element 19. Arranged between the wall 18 and the cover element 19 is a seal, so that the reaction unit 4 is closed in a sealed manner and merely has an opening to the exhaust stub 10a. Inside the reaction unit 4, screening elements 20 are formed. The screening elements 20 are in this case aligned in the horizontal direction and arranged at different heights, at a distance from one another.

In the second end position, shown in FIG. 4, the supporting elements 6 have been fully retracted. The jacket element 8 sits on the bottom element 5 and completely encloses the reaction unit 4. The heating system 2 is closed.

The reaction unit 4, charged with raw materials, is advantageously heated uniformly via the bottom and the wall 18. The combustion tubes 15a serve for heating via the wall 18, while the combustion tubes 15b of the reaction unit 4 that are arranged on the bottom element 5 feed heat through the bottom. The combustion tubes 15a formed at the circumference of the jacket element 8 are at equal distances from the wall 18 of the reaction unit 4 in the closed state of the heating system 2.

The reaction unit 4 remains in the heating system 2 for a period in a range from approximately 2.5 h to 3.5 h, in which the main reaction and conversion of raw materials proceed within the reaction unit 4. Depending on the charging and depending on end products to be produced, the reaction temperature inside the reaction unit 4 is between 350° C. and 650° C. Energy in the range of 40 kWh is consumed per hour. The reaction unit 4 is charged with raw materials of a mass in the range from 2.5 t to 3 t.

The gases produced during the low-temperature carbonization process are discharged through the exhaust stub 10 arranged in the cover element 19 into the exhaust line 11. In the closed state of the heating system 2, the exhaust stub 10a of the reaction unit 4 and the exhaust stub 10b of the shroud 16 of the jacket element 16 are connected to one another in a gastight manner. This ensures that no gases can escape into the intermediate space between the reaction unit 4 and the jacket element 8.

In FIG. 5, the bottom element 5 of the heating system 2 is represented. The bottom element 5 has a base plate 21 and a centering device 22 for the jacket element 8, combustion tubes 15b and also supporting elements 25 for securing the reaction unit 4. The bottom element 5 is formed substantially from ceramic, in order to ensure outward thermal insulation, in particular downwardly. In combination with the thermal insulation of the jacket element 8, the heat loss of the heating system 2 is thereby minimized.

The reaction unit 4 stands on the supporting elements 25 of the base plate 21. The supporting elements 25 are in this case designed and arranged in such a way that the reaction unit 4 is aligned centrally in relation to the bottom element 5 when it rests on the supporting elements 25.

The centering device 22 is designed in the form of a circular disk with an offset. The disk consequently has two regions with different diameters. The circular area arranged between the regions serves as a sealing surface 24.

The outer circumference of the region of the disk with the smaller diameter is in this case smaller than the inner circumference of the wall 18 of the jacket element 8. In the closed state of the heating system 2, a gap is formed between the lateral surface 23 of the region of the disk with the smaller diameter and the inner side of the wall 18. The jacket element 8 stands on the sealing surface 24 of the base plate 21, so that the space enclosed by the jacket element 8 and the base plate 21 is closed in a sealed manner. For the sealing of the enclosed space, seals are arranged on the corresponding surfaces of the base plate 21 and the jacket element 8. Moreover, the jacket element 8 is pressed onto the sealing surface 24 of the base plate 21 and held with a pressure in the range from 1 bar to 2 bar.

Since the supporting elements 6 are also fastened on the base plate 21, the base plate 21 bears the entire heating system 2.

The combustion tubes 15b are arranged substantially in the horizontal direction, arranged on the terminating surface 26 of the centering device 22 and led perpendicularly through the terminating surface 26. The combustion tubes 15b, designed in a bent meandering form, have in each case the form of a hand with five fingers. The length of the fingers increases from the outside inward, so that the middle finger has the greatest length. The combustion tubes 15b are aligned symmetrically in relation to one another, with the tips of the fingers pointing toward the center point of the terminating surface 26.

The supporting elements 25, on which the reaction unit 4 stands, protrude beyond the combustion tubes 15b in the vertical direction, so that the bottom of the reaction unit 4 that is standing on the supporting elements 25 is arranged above the combustion tubes 15b. The combustion tubes 15b are in each case at the same distance from the bottom of the reaction unit 4, in order to ensure a uniform heat input through the bottom of the reaction unit 4.

The centering device 22, the supporting elements 25 and the combustion tubes 15b are arranged concentrically around the center point of the base plate 21.

In FIGS. 6a and 6b, the reaction unit 4 is respectively represented in the closed state, while a sectional representation of the reaction unit 4 can be seen in FIG. 6b.

The wall 18, designed in the form of a hollow-cylindrical vessel, with a closed bottom, can be closed on the open side, opposite from the bottom, by means of a cover element 19. The cover element 19 is detachably fastened to the end face of the wall 18 with the aid of clamping devices 27.

The clamping devices 27, designed as quick-action connection closures, are released for the opening and/or closing of the reaction unit 4, so that the cover element 19 can be removed and the reaction unit 4 charged or emptied.

Between the wall 18 and the cover element 19, a high-temperature-resistant seal is arranged for the sealed closure of the reaction unit 4. The reaction unit 4 has in the closed state a height of approximately 2.4 m.

FIG. 7 shows the distillation unit 3, having the exhaust line 11b, the cooling section 12 and also the oil tank 13 and the gas filter tank 14 in the sequence of the direction in which the end products flow through.

The gases discharged from the heating system 2 are passed through the exhaust line 11b to the cooling sections 12, which are likewise formed by tubes. In this case, the gas mass flow is divided at the branch 28 into two partial mass flows through two tubes aligned parallel to one another. The division of the gas mass flow brings about a better heat transfer from the gas mass flow to the surroundings, in order to optimize the process of distillation or condensation.

To improve the heat transfer further, the tubes are formed with ribs, in order to increase the heat-transferring surface areas of the cooling sections 12.

After flowing through the cooling sections 12, the partial mass flows that were divided before entering the cooling sections 12 are reunited at the confluence 29 and are introduced into the oil tank 13 from above through the inlet stub 30.

The oil, which by contrast with the gas has a relatively great density, settles in the oil tank 13. The non-condensable component of the distillation products is discharged in the upper region of the oil tank 13 through the outlet stub 31 and introduced into the gas filter tank 14. The gas is filtered in the gas filter tank 14 and subsequently removed through the outlet stub 32 for further processing.

In FIG. 8, an oil tank 13 is represented with a cut-open side surface to allow the interior to be seen.

The inlet stub 30 is arranged on the upper side of the oil tank 13, so that the distillation products flow into the oil tank 13 from above. The oil settles on the bottom of the oil tank 13, while the gases, which by contrast with the oil have relatively low densities, are concentrated above the oil level. The oil level in the oil tank 13 is determined and observed with a float 34. When a predetermined filling height is reached, the oil is removed from the oil tank 13 for further processing.

The gases accumulated in the upper region of the oil tank 13 are discharged through the outlet stub 31.

FIGS. 9a and 9b show a gas filter tank 14. In FIG. 9a the gas filter tank 14 is represented with a cut-open side surface to allow the interior to be seen and in FIG. 9b a sectional representation of the gas filter tank 14 is represented.

The inlet stub 33 is arranged in the lower region of a side surface of the gas filter tank 14, so that the gases flow into the gas filter tank 14 from below. On account of their low density, the gases subsequently flow from the bottom upward through the gas filter tank 14 and are cleaned as they flow through perforated plates 35. The perforated plates 35 are consequently designed in such a way as to filter the gas mass flow before it subsequently flows out of the gas filter tank 14 through the outlet stub 32 for further processing.

The non-condensable component of the gases and components of the oil obtained or components of the gas obtained can be used for producing the required process heat, in order to make the process autonomous in terms of energy. The method consequently proceeds without any emission of carbon dioxide. Energy from external sources only has to be used to ensure the start-up of the process. The heating of the reaction unit 4 may also optionally take place with town gas or electrically.

After removal from the heating system 2, the reaction unit 4 is cooled to the temperature defined according to the use of the product. The carbon-iron mixture inside the reaction unit 4 is removed after the opening of the reaction unit 4, that is to say after the removal of the cover element 19. After that, the reaction unit 4 is returned to the process and charged. The carbon-iron mixture is separated into its constituent parts.

Four reaction units 4, produced from high-temperature-resistant steel and each with a filling capacity in the range of 2.5 t to 3.5 t (75% mechanical, 25% automated), are involved simultaneously in the low-temperature carbonization and distillation process for material treatment of the raw materials. While the first reaction unit 4 is being charged, the second reaction unit 4, which has already been charged, is preheated. During this time, the third reaction unit 4 has already been fed to the heating system 2 and is heated, so that the actual low-temperature carbonization and distillation process proceeds. The fourth reaction unit 4 is in the meantime cooled and subsequently emptied.

Use of the modular system, for example with four reaction units 4, allows the throughput to be increased step by step and adapted flexibly to the respective demand. The entire process proceeds quasi-continuously.

What is claimed is:

1. An apparatus for material treatment of raw materials, comprising,
   a heating system, a distillation unit and a reaction unit, wherein the reaction unit is configured to be charged with raw materials, and the heating system is configured to be moved in a vertical direction into an open position and a closed position by support elements for placement of the reaction unit; wherein the heating system comprises a head element and a jacket element firmly connected to the head element, and support elements, wherein the head element is securely fastened at the support elements whose length is changeable in the vertical direction, so that by a change in length of the support elements between an extended and retracted position the vertical movement of the heating system into an open and/or a closed position is effected.

2. The apparatus according to claim 1, wherein the heating system includes two support elements with one support element arranged at each side of the heating system.

3. The apparatus according to claim 1, wherein the jacket element is configured with a hollow cylindrical wall that is open at a lower end and at an upper end is closed with a circular cap, said cap connected with the head element.

4. The apparatus according to claim 3, wherein the cap at a center point is configured with a exhaust gas stub to connect to an exhaust gas line, wherein the exhaust gas line extends from the exhaust gas stub through the cap into the head element.

5. The apparatus according to claim 1, wherein the reaction unit is constructed with a wall in the form of a hollow-cylindrical container which is closed at the bottom and an upper open side of the wall is closed by means of a cover element.

6. The apparatus according to claim 5, wherein the cover element is in circular shape and at a center point has an exhaust gas stub, wherein the exhaust gas stub of the cover element and an exhaust gas stub of the jacket element, in closed position of the heating system, are engaged with each other forming a tight connection to an exhaust gas line.

7. The apparatus according to claim 1, wherein the reaction unit includes screen elements, said screen elements are arranged oriented in a horizontal direction in various heights distanced from each other.

8. A method for operating an apparatus for material treatment of raw materials according to claim 1, and comprising the following steps:
   charging the reaction unit with raw materials,
   preheating the reaction unit,
   opening the heating system and placing the reaction unit on a bottom element of the heating system,
   closing the heating system, so that the reaction unit is in an enclosed space,
   starting a low temperature carbonization-and distillation process by heating the reaction unit,
   discharging gases generated in the reaction unit into a distillation unit,
   cooling and condensing the gases in the distillation unit and obtaining distillation products including oil,
   introducing the distillation products into an oil tank and separating the oil,
   transferring incondensable gases from the oil tank into a gas filter tank and filtering gases,
   opening the heating system and removing the reaction unit from the heating system,
   cooling the reaction unit and removing end products from the reaction unit and separating the end products and
   removing the end products from the oil tank and the gas filter tank, wherein the heating system is opened and closed through extension and retraction of the support elements.

9. The method according to claim 8, wherein upon closing the heating system, an exhaust gas stub of the reaction unit, an exhaust gas stub of an exhaust gas line of the heating system and an exhaust gas line of the distillation unit are coupled with each other via a connector element so that a gas tight connection from the reaction unit to the distillation unit is realized.

10. The method according to claim 8, wherein at least four reaction units are simultaneously operated for a modular process and with the following steps:
- charging a first reaction unit, while a second unit already charged is preheated,
- bringing a third, charged and preheated reaction unit into the system and heating the reaction unit to conduct the carbonization-distillation process and
- cooling and emptying a fourth reaction unit in which the carbonization-and distillation process is ended.

11. The method according to claim 8, characterized in that
- the reaction unit is charged with raw materials of a mass in a range of 2 t to 3 t,
- the reaction unit remains for a period in a range of about 2.5 hrs to 3.5 hrs in the heating system,
- the reaction temperature within the reaction unit is between 350° C. and 650° C. and
- energy in the range of 40 kWh per hr is consumed.

12. An apparatus for material treatment of raw materials, comprising, a heating system, a distillation unit and a reaction unit,
- wherein the reaction unit configured to be charged with raw materials, and the heating system is configured to be moved in a vertical direction into an open position and a closed position for placement of the reaction unit; wherein the heating system comprises a head element and a jacket element firmly connected to the head element and connected to support elements, wherein the head element is securely fastened at the support elements; wherein a length of the support elements is changeable in the vertical direction between two end positions, so that by a change in length of the support elements between the two end positions the vertical movement of the heating system into an open and/or a closed position is effected, wherein the jacket element is configured with a hollow cylindrical wall that is open at a lower end and at an upper end is closed with a circular cap, said cap connected with the head element.

* * * * *